Nov. 11, 1952 N. J. RANNEY 2,617,353

METHOD OF AND APPARATUS FOR HANDLING SLIT COILS

Filed Nov. 30, 1948 2 SHEETS—SHEET 1

INVENTOR
Neil J. Ranney
By Hymes, Leonard & Glenn,
his attorneys.

Nov. 11, 1952 N. J. RANNEY 2,617,353

METHOD OF AND APPARATUS FOR HANDLING SLIT COILS

Filed Nov. 30, 1948 2 SHEETS—SHEET 2

INVENTOR
Neil J. Ranney
By Hooper, Leonard & Glenn,
his attorneys.

Patented Nov. 11, 1952

2,617,353

UNITED STATES PATENT OFFICE 2,617,353

METHOD OF AND APPARATUS FOR HANDLING SLIT COILS

Neil J. Ranney, Euclid, Ohio, assignor to Wean Equipment Corporation, Euclid, Ohio, a corporation of Ohio Application November 30 1948, Serial No. 62,614

15 Claims. (Cl. 100—2)

This invention relates to a method of and apparatus for handling slit coils. It has to do with the handling of slit coils from the take-up reel of a coil slitter or from a mandrel or other coil holding device to which a group of slit coils may be transferred from the take-up reel of a coil slitter.

Wide coils, as, for example, coils of steel strip, are slit into narrower coils in well known manner. A wide coil is disposed upon the pay-off reel of a slitter, the material of the coil being payed off and passing continuously through the slitter proper, the slit coils being wound up on a take-up reel. The efficiency of the slitter depends upon the continuity of its use. As soon as the trailing end of the wide coil has left the pay-off reel a new wide coil may be disposed on the pay-off reel for the next slitting operation. However, serious interruption with continuous use of the slitter has heretofore been occasioned by banding and removal of the slit coils from the slitter take-up reel. Moreover, the manner of handling the coils has been inefficient and has required an undesirably great amount of manual work.

A method of and apparatus for handling slit coils obviating the disadvantages above referred to is disclosed and claimed in copending application Serial No. 62,604, filed of even date herewith. In said application there is disclosed a method of and apparatus for handling slit coils which make provision for immediate removal of the slit coils from the take-up reel as a unit or group so as to free the take-up reel for use in a succeeding slitting operation. This is done prior to banding of the coils. The slit coils may be removed as a group from the take-up reel in a single virtually instantaneous movement so that the take-up reel is freed for use in the subsequent slitting operation almost as soon as the pay-off reel is freed. The result is unprecedentedly little idle slitter time. Also, there is disclosed in said application the handling of slit coils removed from the slitter take-up reel in a rapid and efficient manner so that they are banded and out of the way before the next group of slit coils is ready to be removed from the slitter take-up reel.

I provide a method of and apparatus for handling slit coils which may be employed in connection with the broad aspects of the invention of said application. I preferably follow the teaching of said application in removing as a group in a single virtually instantaneous movement slit coils from the take-up reel of a coil slitter so as to free the take-up reel for immediate use in a succeeding slitting operation. The slit coils may be removed from the take-up reel onto a mandrel or other suitable coil holding device. For example, I may employ, as is the case in said application, a swinging arm coil unloader for receiving the group of slit coils from the slitter take-up reel. Also, I provide for discharging the slit coils one by one from the unloader so that they are sequentially advanced to a banding station where they are banded. However, I provide a novel method and apparatus for handling the slit coils after they are discharged one by one from the mandrel or other coil holding device.

I desirably maintain each slit coil after its separate delivery from the coil holding device and until it has been banded in generally upright position, i. e., with its axis extending generally horizontally. I find that this enables more efficient and easy handling of the coils than otherwise; at portions of the path through which the coils pass they may be rolled, which is not possible when the coils are laid down flat. I desirably provide means for receiving each slit coil as it is discharged from the holding device and delivering it to a banding station while maintaining it upright. Generally, the banding station will be somewhat elevated with respect to the coil holding device and I may employ elevating means taking the slit coils sequentially from the holding device and elevating them to a level approximating the level of the banding station and there discharging them sequentially to the banding station. The coils are maintained upright by the elevator so that when they are discharged from the elevator they roll toward the banding station.

There may be provided an inclined runway upon which the elevated slit coils may pass to the banding station, their movement from the elevator to the banding station thus being effected through the force of gravity. The banding station may include what I term a banding stall having opposed generally upright walls spaced apart a distance only a slightly greater than the width of the coiled strip, and preferably relatively adjustable to provide for the banding of coils of strip of different widths, the banding stall maintaining the integrity of the coil while at the same time holding it upright and guiding it as it rolls along. The opposed walls of the banding stall have their upper edges disposed at an elevation lower than the elevation of the tops of the openings through the coils being banded so as to make it possible for a workman to apply a band about a portion of each coil, the band passing through the coil opening and extending about the coiled strip; such a band is sometimes referred to as a radial band as distinguished from a circumferential band which extends about the coil circumferentially.

Desirably the banding stall has a coil stop which is movable into and out of operative position. When the stop is in operative position it serves to hold a coil which is rolled into the banding stall in position to be banded. After the coil has been banded the stop may be moved to inoperative position to permit the banded coil to roll on to a delivery point. The inclined coil runway may extend through and beyond the banding stall.

Desirably roller means are provided which support a coil when disposed in the banding stall in position to be banded providing for turning of the coil by the banding operator to place it in proper rotative position for banding. For example, there may be a roller in the bottom of the runway in the banding stall and a roller in the coil stop, the two rollers cooperatively rotatively supporting a coil in the banding stall when it is held in position to be banded.

The coil elevator may comprise a tiltable cradle receiving each coil as it is delivered from the coil holding device. The cradle may be pivoted to a portion of the elevator and may have a part which as the elevator is raised engages a detent such as a portion of the banding stall to tilt the cradle to discharge the coil therefrom generally laterally toward the banding stall and onto the inclined runway if such a runway is employed.

Thus I move the slit coils rapidly and efficiently from the coil holding device to the banding station and band them and deliver the banded coils for storage or shipment. The maintaining of the coils in upright position during handling and banding contributes largely to the simplicity and efficiency of my handling method.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same, in which Figure 1 is a plan view of the take-up reel of a coil slitter and apparatus for handling slit coils originally disposed on the take-up reel;

Figure 1:
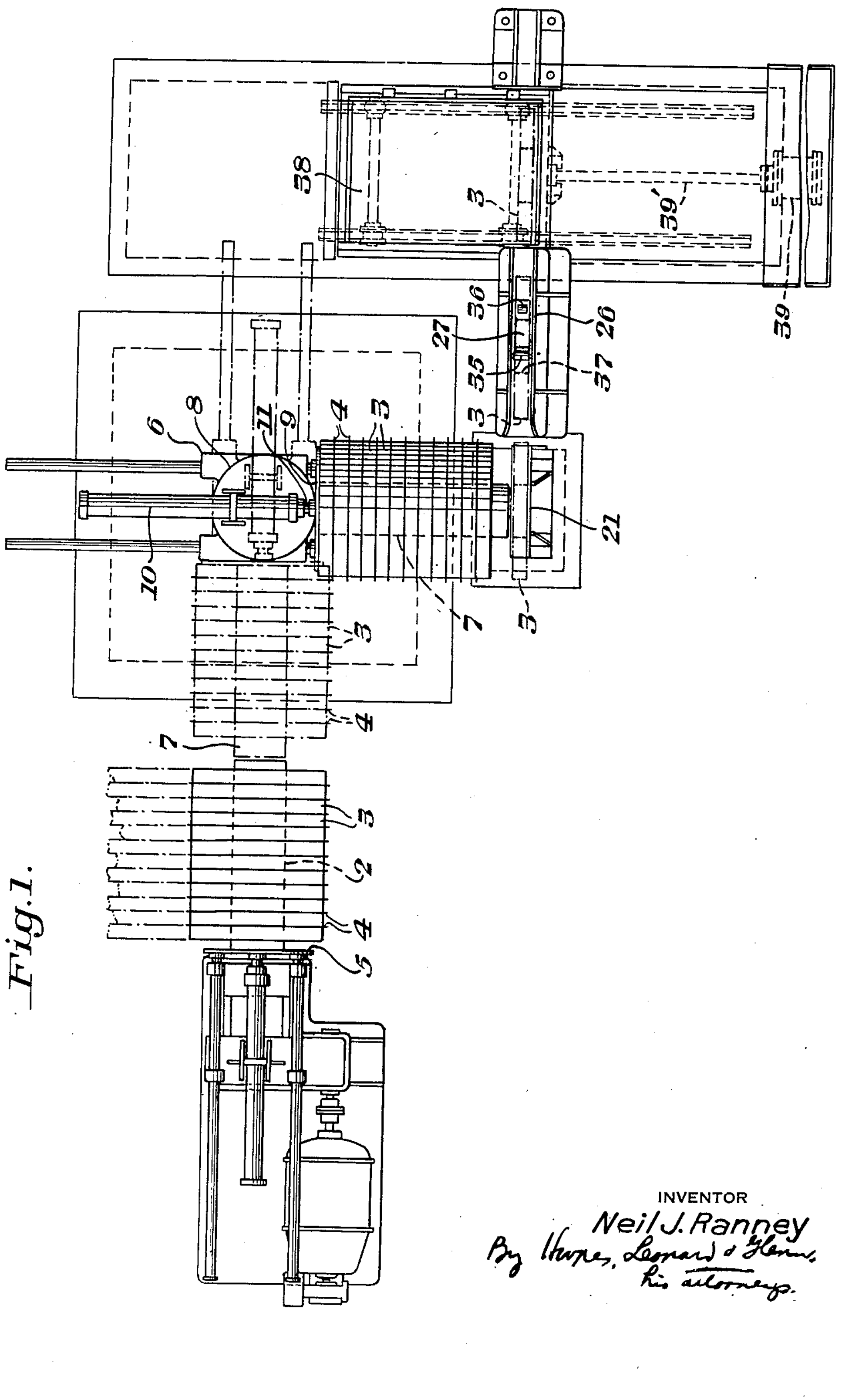
Figures 2, 3:
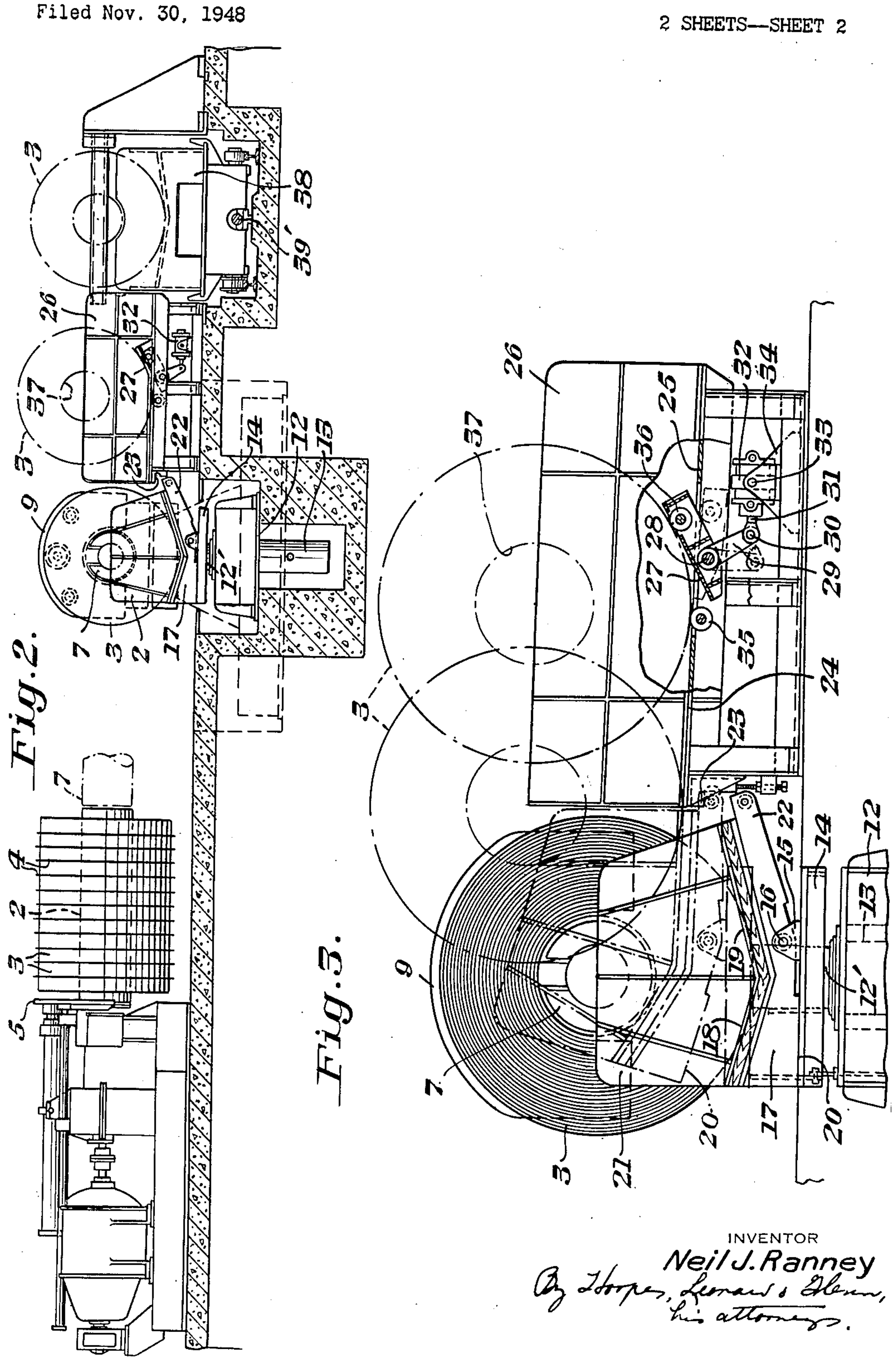
Figure 2 is an elevational view of the apparatus shown in Figure 1.
Figure 3 is an enlarged fragmentary elevational view of a portion of the structure shown in Figure 2.

Referring now more particularly to the drawings, there is shown at 2 in Figures 1 and 2 the take-up reel of a strip slitter. The slitter may be of known construction and I claim no invention in the structure of the slitter or take-up reel. The slitter comprises the usual pay-off reel and slitter proper which are not shown in the drawings. The slitter slits a single wide strip into a plurality of narrow strips which are coiled up on the take-up reel 2 in known manner, the take-up reel being appropriately driven to accomplish its function. In the drawings a wide coil is shown as having been slit into twelve narrow slit coils 3. The twelve coils 3 are shown in Figures 1 and 2 as being disposed in side-by-side co-axial relationship on the slitter take-up reel. The slit coils 3 are shown as being separated by the usual separator discs 4. A pusher 5 is provided in connection with the take-up reel 2, being operable to push the slit coils off of the take-up reel toward the right, viewing Figures 1 and 2. Since the details of the structure of the pusher do not constitute my invention they are not shown. The take-up reel and pusher may be of conventional construction.

I also employ a swinging arm coil unloader designated generally by reference numeral 6 and which may itself be of known construction. Since the unloader as an element of apparatus may be of conventional construction it will not be described in detail. It comprises, however, a receiving mandrel 7 which may be aligned with the take-up reel 2 of the slitter as indicated in chain lines in Figures 1 and 2 and onto which the slit coils 3 may be pushed as a unit or group by operation of the pusher 5. The mandrel 7 is carried by a post 8 which is mounted in a bearing for turning movement about a vertical axis. The post 8 may be turned about its vertical axis from a position in which the mandrel 7 is in alignment with the take-up reel 2 to a position in which the mandrel 7 is disposed at an angle to the axis of the take-up reel 2, for example, a right angle as indicated in solid lines in Figure 1.

The swinging arm coil unloader 6 has a pusher 9 for pushing the slit coils off of the mandrel 7. Mounted on the post 8 is a cylinder 10 containing a piston having a piston rod 11 which carries the pusher 9. As the piston in the cylinder 10 moves downwardly viewing Figure 1 the pusher 9 pushes the slit coils off of the mandrel 7. As will be explained hereinafter, the piston is operated to deliver or discharge the slit coils from the mandrel 7 one at a time.

Disposed adjacent the outer end of the mandrel 7 when the swinging arm coil unloader is in the position shown in solid lines in Figure 1 is an elevator designated generally by reference numeral 12 comprising a plunger 12' operable in a vertical cylinder 13 and carrying a head 14 to which are fastened opposed brackets 15. Pivoted to the brackets 15 at 16 is a tiltable cradle designated generally by reference numeral 17 having coil receiving and supporting surfaces 18 and 19 disposed at an angle to each other so as to cooperatively form a saddle in which a coil may seat. The pivot 16 is disposed to the right of the center of the saddle formed by the surfaces 18 and 19 viewing Figure 3 so that normally when a coil is disposed in the saddle of the cradle it maintains the cradle in the position shown in that figure with the lefthand bottom portion 20 thereof resting atop the head 14. The cradle has a generally upright wall 21 for maintaining a coil in place on the saddle and in upright position.

The cradle 17 has a projecting portion 22 adapted upon raising of the elevator to engage a stop 23 which may form a portion of a banding stall designated generally by reference numeral 24. As the elevator is raised to position the coil at approximately the elevation of the banding stall, the portion 22 of the cradle 17 engages the stop 23 which causes the cradle to turn in the clockwise direction viewing Figure 3 about the axis of the pivot 16 to tilt the saddle toward the right and discharge the coil 3 into the banding stall.

The banding stall comprises an inclined runway 25 which extends downwardly and toward the right viewing Figure 3 from the elevator and to which coils are delivered from the cradle 17 when the elevator is raised as above described. The banding stall has opposed upright walls 26 which are spaced apart a distance only slightly greater than the width of the coiled strip so as to maintain upright a coil disposed therebetween and also maintain the integrity of the coil. A coil delivered into the banding stall from the cradle rolls toward the right, viewing Figure 3.

A portion 27 of the floor of the banding stall is separated from the runway 25 and is mounted for tilting movement upon a transverse shaft 28, the floor portion 27 thus forming a coil stop movable between operative and inoperative positions upon turning of the shaft 28. The coil stop 27 is shown in Figure 3 in solid lines in operative position and in chain lines in inoperative position. When the coil stop is in operative position it intersects the plane of the runway 25 and stops a coil rolled down the runway, holding the coil in place at the banding station until it is banded. Fastened to the shaft 28 is a lever 29 pivoted at 30 to a piston rod 31 carried by a piston in a cylinder 32 pivoted at 33 to opposed brackets 34. Movement of the piston in the cylinder 32 causes movement of the stop 27 between operative and inoperative positions.

Mounted so as to intersect the runway 25 in the banding stall is a roller 35. Mounted in the stop 27 is a similar roller 36. The rollers 35 and 36 are relatively positioned as shown in Figure 3 so that when the stop 27 is in operative position as shown in solid lines in that figure a coil which rolls into the banding stall is supported by the two rollers 35 and 36 so that it may easily be turned by hand by the banding operator to proper circumferential position for banding.

Each coil has therethrough a central opening 37. When a coil is disposed in the banding stall in position to be banded the top of the opening 37 is disposed above the tops of the walls 26 so that the banding operator can pass a band through the opening 37 in the coil and about the coiled strip to band the coil.

I shall now describe the present preferred practice of my improved method of handling slit coils employing the apparatus above described. At the completion of the slitting operation the slit coils 3 are disposed in side-by-side coaxial relationship on the slitter take-up reel 2 with their common axis substantially horizontal. Immediately upon completion of the slitting step the mandrel 7 is disposed in alignment with the take-up reel 2 and the pusher 5 is operated to push the group of coils 3 in a single continuous movement off of the reel 2 and onto the mandrel 7. Thus, the take-up reel 2 of the slitter is virtually instantaneously freed for use in a succeeding slitting operation. The swinging arm coil unloader 6 is swung to the position in which the mandrel is disposed at approximately right angles to the axis of the take-up reel 2 and in alignment with the elevator 12 as shown in solid lines in Figure 1 and as shown in Figures 2 and 3. At such time the elevator is in its lowered position. The pusher 9 is operated just far enough to push the end coil 3 off of the mandrel 7 onto the cradle 17, the saddle of the cradle being just slightly below the lower portion of the periphery of the coil as it is discharged from the mandrel 7. The discharged coil is disposed against the wall 21 of the cradle which maintains it upright. The coil is positioned in the cradle by the surfaces 18 and 19 as shown in Figure 3. The separator disc 4 behind the coil is removed.

With the coil thus positioned on the cradle and with the cradle disposed in the position shown in full lines in Figure 3 the elevator 12 is raised. As the coil nears the elevation of the banding stall the projecting portion 22 of the cradle engages the stop 23, tilting the cradle to the chain line position of Figure 3. When the cradle is thus tilted the surface 19 is inclined somewhat downwardly from right to left viewing Figure 3 and is also in alignment with the runway 25. The coil rolls by gravity (or, if necessary, may be given a gentle push) so that it enters the banding stall between the walls 26 thereof. As the runway 25 is inclined downwardly toward the right viewing Figure 3 the coil advances by gravity.

As the coil enters the banding stall the stop 27 is in the operative or full line position of Figure 3. The coil comes to rest against the stop which prevents it from moving farther. When the coil thus comes to rest it is supported by the rollers 35 and 36. The operator may turn the coil if necessary to bring it into proper position for banding whereupon he applies the band, passing it through the coil opening 37 and about the periphery of the coil. Thereafter the stop 27 is moved to the inoperative position indicated by chain lines in Figure 3, permitting the banded coil to roll to the right out of the banding stall. It may be received by a car 38 or other receptacle. A piston operating in a cylinder 39 is shown for advancing through the piston rod 39′ the car 38 step by step as coils are delivered into it so that the car may be filled with coils.

After the cradle 17 discharges its coil the elevator 12 is lowered to its original position. When the portion 22 of the cradle parts contact with the stop 23 during downward movement of the elevator the cradle overbalances from the chain line position of Figure 3 to the full line position of Figure 3 in readiness to receive the next coil. When the cradle is disposed in coil receiving position relatively to the mandrel 7 as above described another coil is pushed off of the mandrel onto the cradle as above described and the cycle is repeated.

Thus the slit coils are handled separately from the mandrel 7, the operation being rapid and efficient and resulting in sequential movement of the coils to the elevator and the banding stall in rapid succession while the coils are maintained upright. Each time one of the slit coils is pushed off of the mandrel 7 the pusher 9 is advanced only a distance equal to the thickness of the coil plus the thickness of one of the discs 4, the remaining slit coils remaining on the mandrel.

I thus accomplish very rapid and efficient handling of the slit coils, insuring a minimum of time during which the slitter is not in operation and also insuring a minimum of labor in manual handling of the coils. The only manual work which has to be done on the coils is to insure their movement from the cradle into the banding stall, banding them and insuring their movement from the banding stall to the delivery point. Ordinarily movement of the coils will come about through the action of gravity and no handling of the coils other than banding them is required.

While I have shown and described a present preferred embodiment of the invention and have illustrated a present preferred method of practicing the same, it is to be distinctly understood that the invention is not limited thereto but may be otherwise variously embodied and practiced within the scope of the following claims.

I claim:

1. Apparatus for handling unbanded coils originally disposed in a group in side-by-side relationship on a support with the axes of the coils generally horizontal, comprising a receiving station for receiving a coil of the group of coils, the receiving station having a dimension parallel to the axes of the coils less than the axial dimension of the group of coils, means for pushing the coils generally axially of the coils to remove them one by one from the support to sequentially separate individual coils from the group and dispose each such separated coil at the receiving station, said means being disposed at the end of the group of coils axially opposite the receiving station, a banding station to receive the coils sequentially from the receiving station and means confining each coil at its sides to maintain it with its axis generally horizontal during substantially its entire movement from the receiving station to the banding station.

2. Apparatus for handling unbanded coils originally disposed in a group in side-by-side relationship on a support with the axes of the coils generally horizontal, comprising a receiving station for receiving a coil of the group of coils and means for pushing the coils generally axially of the coils to remove them one by one from the support to sequentially separate individual coils from the group and dispose each such separated coil at the receiving station, said means being disposed at the end of the group of coils axially opposite the receiving station, the receiving station comprising a tilting receiver having a dimension parallel to the axes of the coils less than the axial dimension of the group of coils adapted to receive each such separated coil with its axis generally horizontal when the receiver is in one position and then to be tilted generally in a vertical plane normal to the coil axis to initiate rolling of the coil from the receiving station.

3. Apparatus for handling unbanded coils originally disposed in a group in side-by-side relationship on a support with the axes of the coils generally horizontal, comprising a receiving station for receiving a coil of the group of coils and means for pushing the coils generally axially of the coils to remove them one by one from the support to sequentially separate individual coils from the group and dispose each such separated coil at the receiving station, said means being disposed at the end of the group of coils axially opposite the receiving station, the receiving station having a generally upright wall against which each such separated coil is adapted to lie as the coil is delivered from the support to maintain the coil with its axis generally horizontal and means mounting said wall in permanently upright position, said wall limiting the dimension of the receiving station parallel to the axes of the coils to less than the axial dimension of the group of coils.

4. Apparatus for handling unbanded coils originally disposed in a group in side-by-side relationship on a support with the axes of the coils generally horizontal, comprising a receiving station for receiving a coil of the group of coils and means for pushing the coils generally axially of the coils to remove them one by one from the support to sequentially separate individual coils from the group and dispose each such separated coil at the receiving station, said means being disposed at the end of the group of coils axially opposite the receiving station, the receiving station having a receiver having a dimension parallel to the axes of the coils less than the axial dimension of the group of coils and being movable generally vertically, and means actuated upon predetermined generally vertical movement of the receiver initiating rolling of the coil from the receiver.

5. Apparatus for handling unbanded coils originally disposed in a group in side-by-side relationship on a support with the axes of the coils generally horizontal, comprising a receiving station for receiving a coil of the group of coils and means for pushing the coils generally axially of the coils to remove them one by one from the support to sequentially separate individual coils from the group and dispose each such separated coil at the receiving station, said means being disposed at the end of the group of coils axially opposite the receiving station, the receiving station having a generally vertically movable receiver having a tilting top and having a generally upright wall against which each such separated coil is adapted to lie as the coil is delivered from the support to maintain the coil with its axis generally horizontal, said wall limiting the dimension of the receiving station parallel to the axes of the coils to less than the axial dimension of the group of coils, and means interposed in the path of generally vertical movement of the receiver engaging a portion of the receiver when the receiver has moved a predetermined distance to tilt the top of the receiver to initiate rolling of the coil from the receiver.

6. Apparatus for handling unbanded coils originally disposed in a group in side-by-side relationship on a support with the axes of the coils generally horizontal, comprising a receiving station for receiving a coil of the group of coils, the receiving station having a dimension parallel to the axes of the coils less than the axial dimension of the group of coils, means for pushing the coils generally axially of the coils to remove them one by one from the support to sequentially separate individual coils from the group and dispose each such separated coil at the receiving station, said means being disposed at the end of the group of coils axially opposite the receiving station, a stationary banding stall to receive the coils sequentially from the receiving station and a banded coil receptacle movable to position it to sequentially receive banded coils from the banding stall.

7. Apparatus for handling unbanded coils originally disposed in a group in side-by-side relationship on a support with the axes of the coils generally horizontal, comprising a receiving station for receiving a coil of the group of coils, the receiving station having a dimension parallel to the axes of the coils less than the axial dimension of the group of coils, means for pushing the coils generally axially of the coils to remove them one by one from the support to sequentially separate individual coils from the group and dispose each such separated coil at the receiving station, said means being disposed at the end of the group of coils axially opposite the receiving station, a banding station to receive the coils sequentially from the receiving station and movable arresting means at the banding station movable into position in the path of a coil to arrest the coil at the banding station and movable into position out of the path of the coil to permit movement of the coil in its original direction of movement out of the banding station.

8. Apparatus for handling unbanded coils originally disposed in a group in side-by-side relationship on a support with the axes of the coils generally horizontal, comprising a receiving station for receiving a coil of the group of coils, the receiving station having a dimension parallel to the axes of the coils less than the axial dimension of the group of coils, means for pushing the coils generally axially of the coils to remove them one by one from the support to sequentially separate individual coils from the group and dispose each such separated coil at the receiving station, said means being disposed at the end of the group of coils axially opposite the receiving station, a banding station to receive the coils sequentially from the receiving station and roller means supporting a coil at the banding station with its axis in substantially fixed position for turning movement about its axis to properly orient it for banding.

9. Apparatus for handling unbanded coils originally disposed in a group in side-by-side relationship on a support with the axes of the coils generally horizontal, comprising a receiving station for receiving a coil of the group of coils, the receiving station having a dimension parallel to the axes of the coils less than the axial dimension of the group of coils, means for pushing the coils generally axially of the coils to remove them one by one from the support to sequentially separate individual coils from the group and dispose each such separated coil at the receiving station, said means being disposed at the end of the group of coils axially opposite the receiving station, a banding station to receive the coils sequentially from the receiving station, movable arresting means at the banding station movable into position in the path of a coil to arrest the coil at the banding station and movable into position out of the path of the coil to permit movement of the coil in its original direction of movement out of the banding station, the arresting means comprising roller means, and additional roller means at the banding station cooperating with the first mentioned roller means when the arresting means is in the first mentioned position for supporting the coil at the banding station for turning movement about its axis to properly orient it for banding.

10. Apparatus for handling unbanded coils originally disposed in a group in side-by-side relationship on a support with the axes of the coils generally horizontal, comprising a receiving station for receiving a coil of the group of coils and means for pushing the coils generally axially of the coils to remove them one by one from the support to sequentially separate individual coils from the group and dispose each such separated coil at the receiving station, said means being disposed at the end of the group of coils axially opposite the receiving station, the receiving station having a generally upright wall against which each such separated coil is adapted to lie as the coil is delivered from the support to maintain the coil with its axis generally horizontal, said wall limiting the dimension of the receiving station parallel to the axes of the coils to less than the axial dimension of the group of coils and being adapted to cooperate with the next coil while the latter is still on the support to confine the separated coil at its sides to maintain it with its axis generally horizontal, and means receiving the coils sequentially from the receiving station having portions confining each coil at its sides to maintain it with its axis generally horizontal, whereby to positively maintain each coil with its axis generally horizontal throughout the handling of the coil by the apparatus.

11. A method of handling unbanded coils originally disposed in a group in side-by-side relationship on a support with the axes of the coils generally horizontal, comprising sequentially separating individual coils from the group by pushing the same in a direction generally parallel to the axes of the coils to remove them sequentially from the support into position with a side face of each coil against a wall maintaining the coil with its axis generally horizontal, prior to removing the next coil from the support moving each such separated coil toward a banding station with its axis generally horizontal and sequentially banding the coils, each when it is disposed at the banding station.

12. A method of handling unbanded coils originally disposed in a group in side-by-side relationship on a support with the axes of the coils generally horizontal, comprising sequentially separating individual coils from the group by pushing the same in a direction generally parallel to the axes of the coils to remove them sequentially from the support into position with a side face of each coil against a wall maintaining the coil with its axis generally horizontal, prior to removing the next coil from the support rolling each such separated coil toward a banding station with its axis generally horizontal and sequentially banding the coils, each when it is disposed at the banding station.

13. A method of handling unbanded coils originally disposed in a group in side-by-side relationship on a support with the axes of the coils generally horizontal, comprising sequentially separating individual coils from the group by pushing the same in a direction generally parallel to the axes of the coils to remove them sequentially from the support into position with a side face of each coil against a wall maintaining the coil with its axis generally horizontal, prior to removing the next coil from the support moving each such separated coil toward a banding station, at all times until each such separated coil has been banded and is ready for delivery from the banding station confining it at its sides to maintain it with its axis generally horizontal and banding the coils at the banding station.

14. A method of handling unbanded coils originally disposed in a group in side-by-side relationship on a support with the axes of the coils generally horizontal, comprising sequentially separating individual coils from the group by pushing the same in a direction generally parallel to the axes of the coils to remove them sequentially from the support into position with a side face of each coil against a wall maintaining the coil with its axis generally horizontal, prior to removing the next coil from the support moving each such separated coil toward a banding station with its axis generally horizontal, at the banding station supporting each such separated coil for turning movement about its axis to properly orient it for banding, turning each such separated coil about its axis at the banding station if necessary to properly orient it for banding and banding the same.

15. A method of handling unbanded coils originally disposed in a group in side-by-side relationship on a support with the axes of the coils generally horizontal, comprising sequentially separating individual coils from the group by pushing the same in a direction generally parallel to the axes of the coils to remove them sequentially from the support into position with a side face of each coil against a wall maintaining the coil with its axis generally horizontal and while maintaining the thus separated coils with their axes generally horizontal sequentially moving them along a predetermined path through a banding station and sequentially banding the coils, each when it is disposed at the banding station.

NEIL J. RANNEY.

REFERENCES CITED

The following references are of record in the file of this patent:

UNITED STATES PATENTS

| Number | Name | Date |
|---|---|---|
| 1,779,381 | Johnson | Oct. 21, 1930 |
| 2,156,695 | Klein | May 2, 1939 |
| 2,281,423 | Egge | Apr. 28, 1942 |
| 2,288,621 | Greer | July 7, 1942 |
| 2,327,906 | Kiefer | Aug. 24, 1943 |
| 2,430,075 | Olson | Nov. 4, 1947 |
| 2,485,961 | Duby | Oct. 25, 1949 |